United States Patent
Kitano et al.

(10) Patent No.: US 8,226,247 B2
(45) Date of Patent: Jul. 24, 2012

(54) PROJECTION TYPE IMAGE DISPLAY DEVICE

(75) Inventors: Hiroshi Kitano, Hyogo (JP); Yoshimasa Fushimi, Osaka (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 12/663,791

(22) PCT Filed: Jun. 4, 2008

(86) PCT No.: PCT/JP2008/001409
§ 371 (c)(1), (2), (4) Date: Dec. 9, 2009

(87) PCT Pub. No.: WO2008/152781
PCT Pub. Date: Dec. 18, 2008

(65) Prior Publication Data
US 2010/0171927 A1  Jul. 8, 2010

(30) Foreign Application Priority Data
Jun. 12, 2007  (JP) ................. 2007-154777

(51) Int. Cl.
*G03B 21/28* (2006.01)

(52) U.S. Cl. ............. 353/99; 353/30; 353/31; 353/33; 353/38; 353/84; 353/94; 353/98; 353/119; 353/122

(58) Field of Classification Search ............ 353/30, 353/31, 33, 38, 84, 94, 98, 99, 119, 122; 359/20, 231, 245, 237, 238, 279, 310, 316, 359/291, 455, 463, 558, 559, 599, 619, 618, 359/621, 622, 712, 256, 489.01, 489.06, 359/489.15, 489.16; 372/29.01, 29.014, 372/29.015, 38.02, 38.07, 29.011, 29.02, 372/38.01, 39, 43.01; 349/5, 7, 8, 9, 181; 348/74, 655
See application file for complete search history.

(56) References Cited

U.S. PATENT DOCUMENTS

| | | | | |
|---|---|---|---|---|
| 5,153,752 A * | 10/1992 | Kurematsu et al. | ............... | 349/9 |
| 5,239,322 A * | 8/1993 | Takanashi et al. | ............... | 353/31 |
| 5,260,815 A * | 11/1993 | Takizawa | ............... | 349/159 |
| 5,283,600 A * | 2/1994 | Imai | ............... | 353/34 |

(Continued)

FOREIGN PATENT DOCUMENTS

JP  1-152411 A  6/1989
(Continued)

*Primary Examiner* — Georgia Y Epps
*Assistant Examiner* — Sultan Chowdhury
(74) *Attorney, Agent, or Firm* — Hamre, Schumann, Mueller & Larson, P.C.

(57) ABSTRACT

Red, green, and blue laser light emitted from laser light sources 1-3 is transformed into substantially parallel beams by collimator lenses 4-6, collected by microlens arrays 7-9, and rendered uniform by rod integrators 10-12, whereupon it is used to illuminate spatial light modulation elements 16-18 and subjected to modulation. The modulated laser light exiting from the spatial light modulation elements 16-18 is recombined using a beam-combining prism 19 and subjected to pixel separation using a birefringent plate 20, which is rotationally driven by a birefringent plate rotary drive unit 26, after which it is projected upon a screen 22 using a projection optical system 21. The birefringent plate 20 spatially separates the modulated laser light using birefringence. When pixels are spatially separated by the birefringent plate, the pixel grid region is made smaller, the distribution of brightness on the screen is rendered uniform, and speckle noise is reduced.

9 Claims, 10 Drawing Sheets

U.S. PATENT DOCUMENTS

| | | | |
|---|---|---|---|
| 6,157,660 A * | 12/2000 | Hill | 372/27 |
| 6,480,634 B1 * | 11/2002 | Corrigan | 385/4 |
| 6,560,001 B1 * | 5/2003 | Igasaki et al. | 359/245 |
| 6,594,090 B2 * | 7/2003 | Kruschwitz et al. | 359/707 |
| 6,678,078 B1 * | 1/2004 | Popovich et al. | 359/15 |
| 6,781,763 B1 * | 8/2004 | Tamburino et al. | 359/629 |
| 6,805,445 B2 * | 10/2004 | Silverstein et al. | 353/20 |
| 6,966,658 B2 * | 11/2005 | Fushimi et al. | 353/102 |
| 7,562,988 B2 * | 7/2009 | Kasazumi et al. | 353/94 |
| 2002/0154375 A1 | 10/2002 | Roddy et al. | |
| 2002/0196414 A1 * | 12/2002 | Manni et al. | 353/31 |
| 2003/0133079 A1 * | 7/2003 | Cobb | 353/31 |
| 2004/0257664 A1 | 12/2004 | Hashimoto et al. | |
| 2007/0030551 A1 * | 2/2007 | Oka et al. | 359/237 |

FOREIGN PATENT DOCUMENTS

| | | |
|---|---|---|
| JP | 1-233477 A | 9/1989 |
| JP | 8-286382 A | 11/1996 |
| JP | 11-064789 A | 3/1999 |
| JP | 2001-296503 A | 10/2001 |
| JP | 2002-323675 A | 11/2002 |
| JP | 2003-156698 A | 5/2003 |
| JP | 2004-045684 A | 2/2004 |
| JP | 2004-503923 A | 2/2004 |
| JP | 2005-234156 A | 9/2005 |
| JP | 2006-023378 A | 1/2006 |

* cited by examiner

PROJECTION TYPE IMAGE DISPLAY DEVICE

TECHNICAL FIELD

The present invention relates to a projection type image display device, in which an image formed by spatial light modulation elements is illuminated with laser light and projected upon a screen using a projection lens.

BACKGROUND ART

Conventionally, projection type image display devices such as projectors have been used for obtaining large-screen images in an efficient manner. In projection type image display devices, liquid crystal panels or other spatial light modulation elements are used to form images in response to a picture signal and are illuminated with light from a lamp, so that their optical images are projected in an enlarged form upon a screen using a projection lens.

However, the use of a lamp as the light source is accompanied by a variety of problems, including: (1) short useful life and burdensome maintenance of the light source; (2) the complicated optical system required in order to separate white light into the three primary colors of light; and (3) a narrow color reproduction range.

In order to overcome these problems, projection type image display devices have been proposed, in which laser light sources are used instead of lamps. The useful life of laser light sources is longer than that of a lamp, and furthermore, due to its high directivity, the light usage efficiency of laser light is higher as well. In addition, its monochromaticity allows for a wide color reproduction range.

However, due to the high coherency, use of laser light is associated with the problem of speckle noise generation that causes image quality deterioration. Speckle noise is generated as a result of interference between light bundles in the image plane in accordance with complex phase relationships due to the scattering of phase-aligned waves emitted from laser light sources by rough object surfaces. Speckle noise is observed as an irregular granular intensity distribution.

If speckle noise appears in an image display device, viewers recognize it as degraded image quality. For this reason, when providing a laser light-based projection type image display device, it is extremely important to remove or reduce speckle noise. Various methods have been proposed for reducing such speckle noise (Patent Documents 1-5).

Patent Document 1 discloses reduction of speckle noise by effecting lasing action using an expanded spectral width. Further, Patent Document 2 discloses obtaining similar effects using a plurality of light sources of different wavelengths. However, in light sources with a narrow spectral width, such as in the case of green laser light obtained by means of wavelength conversion, practical application of the above presents difficulties.

Further, Patent Document 3 discloses separating laser light into a P-polarized component and an S-polarized component, combining them while introducing a light path difference, and impinging the laser light upon spatial light modulation elements. However, this method is difficult to apply when the light incident upon the spatial light modulation elements must be linearly polarized, such as when using liquid crystal light valves.

In another approach, various uncorrelated speckle patterns changing with time are generated and human-perceived speckle noise is reduced due to a superimposition effect. Patent Document 4 discloses generating various speckle patterns by subjecting the phase of light projected onto a screen to temporal modulation by vibrating optical fibers. Patent Document 5 discloses rotating fly-eye lenses about the axes of laser beams so as to change the angle of incidence of light upon spatial light modulation elements and generate a variety of speckle patterns.

Patent Document 1 JP 2002-323675A
Patent Document 2 JP 2004-503923A (Tokuhyo)
Patent Document 3 JP 2001-296503A
Patent Document 4 JP 2003-156698A
Patent Document 5 JP H11-064789A

DISCLOSURE OF INVENTION

Problem to be Solved by the Invention

While any one of the above-mentioned methods is effective in reducing speckle noise, using only one method cannot remove speckle noise completely, and in order to obtain high-quality video images, it is desirable to use an additional speckle reduction means in combination.

The methods disclosed in the Patent Documents 1-5 mentioned above are based on the phase, polarization, and wavelength characteristics of laser light. However, another important factor that affects the magnitude of speckle noise is the uniformity of brightness of light projected upon a screen.

In general, in a two-dimensional spatial light modulating element with a fixed pixel structure, such as a liquid crystal light valve or digital micromirror device (DMD), etc., there are regions impervious to light between one pixel and the next. As a result, non-illuminated pixel grid areas, which are called the black matrix, are formed on the screen.

The presence of brightness non-uniformities at the pixel unit level due to the pixel grid causes unnatural-looking images such as voids in the original signal and thereby lowers the level of image quality. Furthermore, the amount of speckle noise also is affected by a laser as the light source.

When there are on-screen brightness non-uniformities with a periodicity equal to or lower than, the resolution of the human eye, the amount of speckle noise perceived by the human eye is governed by the amount of speckle noise in high-brightness locations. Even if the average brightness is the same, the presence of the brightness non-uniformities increases the amount of speckle noise and reduces the level of image quality in comparison with cases in which there are no such brightness non-uniformities. For this reason, to obtain high-quality natural-looking images, it is important to make the pixel grid as inconspicuous as possible.

Although the defocussing of a projection optical system is believed to be a simple and easy way to eliminate brightness non-uniformities and reduce speckle noise, it does not allow for the image quality level to be maintained because the projection image itself turns into a blurred image that lacks a sharp and clean appearance.

Taking into account the above-described problems, it is an object of the present invention to provide a projection type image display device that permits efficient reduction in speckle noise while obtaining natural-looking images by making the pixel grid appear less conspicuous in an easy and convenient manner.

Means for Solving Problem

In order to overcome the above-described problems, the inventive projection type image display device includes: at least one laser light source that emits laser light; a spatial light modulation element that modulates the laser light in response to a picture signal; a projection optical system that projects the modulated laser light exiting from the spatial light modulation element upon a screen; and a pixel separation element that spatially separates the modulated laser light using birefringence.

Effects of the Invention

In accordance with the present invention, pixels are spatially separated into a plurality of pixels using a birefringence, so as to reduce the regions of the pixel grid that are the non-effective portions of the pixels of the spatial light modulation elements, making the pixel grid less conspicuous. As a result, the distribution of brightness on the screen is rendered uniform, so that speckle noise is reduced.

DESCRIPTION OF REFERENCE NUMERALS

Figure 1:
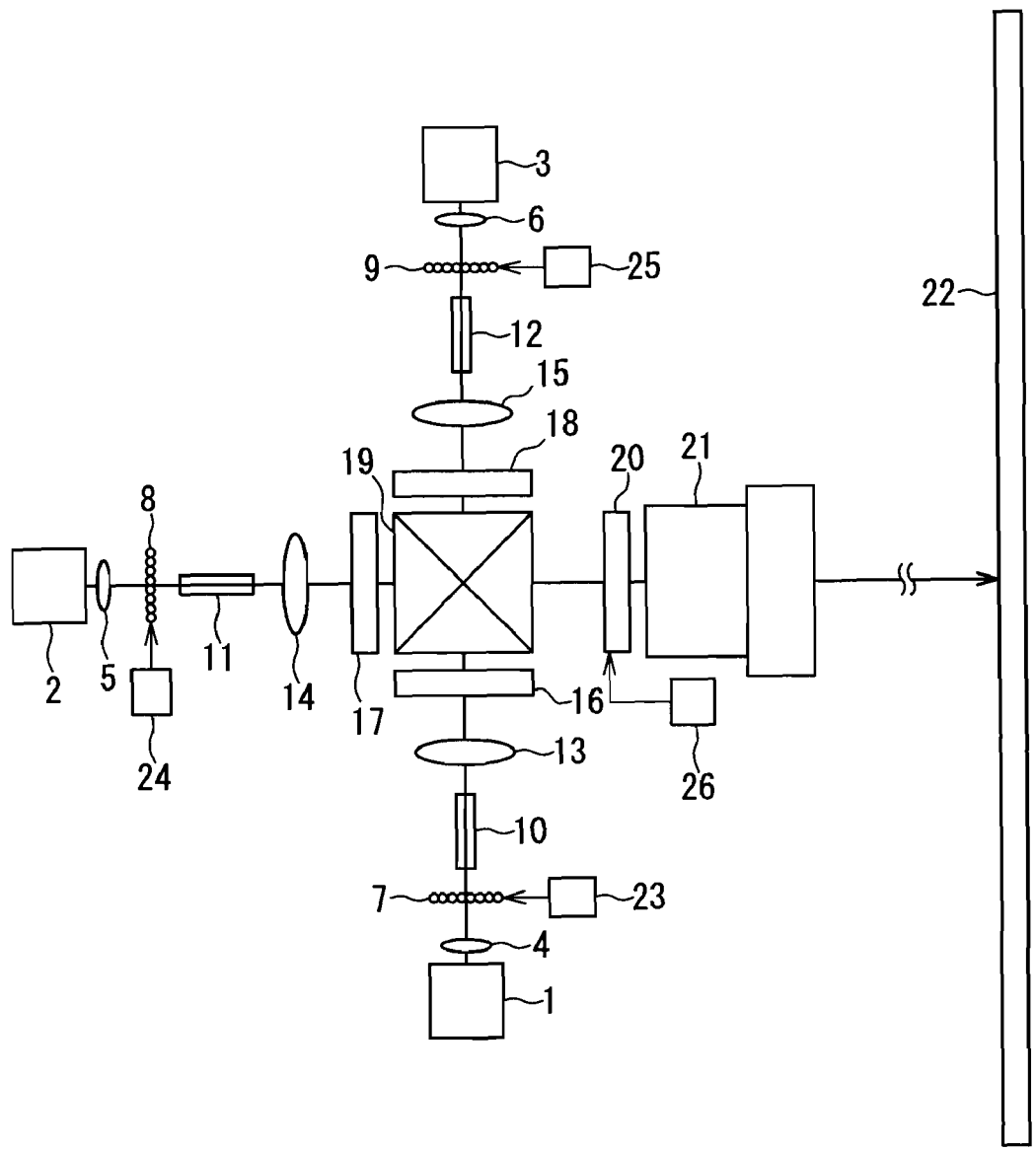
FIG. 1 is a schematic diagram of a projection type image display device used in Embodiment 1 of the present invention.

1 Red laser light source
2 Green laser light source
3 Blue laser light source
4-6 Collimator lenses
7-9 Microlens arrays
10-12 Rod integrators
13-15 Relay optical system
16-18 Transmissive liquid crystal light valves
19 Beam combining prism
20, 28 Birefringent plates
21 Projection optical system
22 Screen
23-25 Microlens array rotary drive units
26 Birefringent plate rotary drive unit
27 Phase retardation plate
28a-28c First to third birefringent plates
29-31 Total reflection mirrors
32-34 Polarizing beam splitters
35-37 Reflective liquid crystal light valves
38 Half wave plate
39 Liquid crystal element
40 Liquid crystal element control unit
41 Housing
42 Optical engine
43 Total reflection mirror
44 Screen

DESCRIPTION OF THE INVENTION

Based on the above-described configuration, the projection type image display device of the present invention can assume the various embodiments below.

Namely, the pixel separation element can be disposed between the spatial light modulation elements and the projection optical system. Further, an arrangement can be used in which the pixel separation element is made up of multiple birefringent plates and the multiple birefringent plates are disposed such that the optic axes thereof are oriented in mutually different directions. Transmissive liquid crystal light valves can be employed as the spatial light modulation elements.

Further, phase modulators that modulate the phase of the laser light in time preferably are disposed between the spatial light modulation elements and the laser light sources. The phase modulators can be constituted by microlens arrays and microlens array rotary drive units that rotate the microlens arrays. Further, an arrangement can be used in which a phase retardation plate that converts the polarization state of the laser light from linear polarization to elliptical polarization is disposed between the spatial light modulation elements and the pixel separation element.

Further, it is preferable to provide a pixel separation element modulator that modulates the direction of birefringence of the pixel separation element in time. As a result of subjecting the direction of birefringence of the pixel separation element to temporal modulation, the pixel position or the polarization direction of light projected upon the screen is changed with time, thereby generating a variety of speckle patterns. For this reason, even better speckle noise reduction effects can be obtained.

In this case, an arrangement can be used in which the polarization direction of the modulated laser light projected in an enlarged form upon the screen is subjected to temporal modulation. Alternatively, an arrangement can be used in which the position of projection of the modulated laser light projected in an enlarged form upon the screen is modulated in time. Further, an arrangement can be used in which the pixel separation element is a birefringent plate and the pixel separation element modulator is a birefringent plate rotary drive unit that rotates the birefringent plate.

Below, some embodiments of the present invention will be described in detail with reference to the drawings.

Embodiment 1

FIG. 1 is a diagram that describes a projection type image display device used in Embodiment 1 of the present invention. Three color laser light sources, i.e. red, green, and blue, are used in this embodiment. For example, a semiconductor laser that emits directly a laser light having a wavelength of 638 nm is used as a red laser light source 1, the second harmonic of an Yb fiber laser having a wavelength of 532 nm is used as a green laser light source 2, and a semiconductor laser that emits directly a laser light having a wavelength of 445 nm is used as a blue laser light source 3.

It should be obvious, however, that laser light sources suitable for carrying out the present invention are not limited to the laser light sources illustrated in this embodiment. For instance, the second harmonic of a near-infrared semiconductor laser can be used as the red laser light source 1. A semiconductor laser that lases directly in the green, the second harmonic of a near-infrared semiconductor laser, the second harmonic of a Nd:YAG laser, and the second harmonic of a Nd:YVO4 laser can be used as the green laser light source 2. The second harmonic etc. of a near-infrared semiconductor laser can be used as the blue laser light source 3.

Regardless of the laser light source, if the beam divergence angle is large, it is preferable to use a collimator lens to ensure efficient propagation of the laser beam.

In FIG. 1, laser light emitted from red, green, and blue laser light sources 1-3 is transformed into substantially parallel beams by collimator lenses 4-6, collected by microlens arrays 7-9 and impinged upon rod integrators 10-12. The rod integrators 10-12 are used to render the distribution of brightness of the laser light uniform so as to bring it into a state suitable for use as illumination light on the spatial light modulation elements.

As long as no losses occur in the subsequent optical system, the NA (Numerical Aperture) of the laser light impinging upon the rod integrators 10-12 preferably is large. It should be noted that fly-eye lenses may be used instead of the rod integrators 10-12.

Relay optical systems 13-15 relay the laser light exiting from the rod integrators 10-12 to transmissive liquid crystal light valves 16-18 serving as spatial light modulation elements. The transmissive liquid crystal light valves 16-18 spatially modulate the incident light and form an optical image composed of a plurality of pixels.

The red, green, and blue laser light beams exiting from the transmissive liquid crystal light valves 16-18 are combined by a beam combining prism 19 and then impinged upon a birefiingent plate 20 serving as a pixel separation element. The red, green, and blue laser light is split by the pixel-separating effect of the birefringent plate 20 such that each pixel forms a pixel pattern separated into two pixels, after which the light is projected upon a screen 22 by a projection optical system 21. The term "pixel separation" refers to the splitting of a light bundle such that a single pixel is separated into a plurality of pixels arranged in mutually shifted positions. In the case of a pixel separation element utilizing the birefringent plate 20, as hereinafter described, the pixel-separating effect is caused by splitting light bundles according to the polarization direction.

The microlens arrays 7-9 are driven by microlens array rotary drive units 23-25 to rotate about axes parallel to the optical axis of the incident light. The birefringent plate 20 also is driven by a birefringent plate rotary drive unit 26 to rotate about an axis parallel to the optical axis of the projection optical system 21. A unit of any configuration that can be built using well-known technology may be employed as the rotary drive unit.

In this embodiment, lens assemblies possessing refractive power both in the horizontal and vertical direction are used as the microlens arrays 7-9. However, for example, it is also possible to use lenticular lenses, i.e. assemblies of cylindrical lenses.

Next, a description will be given of pixel separation by the birefringent plate 20. The birefringent plate 20 is used to effect action whereby incident light is split into an ordinary ray and an extraordinary ray, and its optic axis is not parallel to the optical axis of the projection optical system 21. The angle that the optic axis of the birefringent plate 20 makes with the optical axis of the projection optical system 21 is adapted to be approximately 45 degrees in order to ensure the maximum amount of separation per unit thickness. The term "amount of separation" refers to the distance between pixels positionally displaced by pixel separation.

In this embodiment, a birefringent plate made, for example, of quartz crystal, can be employed as the birefringent plate 20. There are no particular limitations as to the material of the birefringent plate, and a variety of birefringent materials including sapphire and lithium niobate can be utilized.

Since the insertion of the birefringent plate 20 as a pixel separation element between the beam combining prism 19 and the projection optical system 21 results in projecting pixel patterns including pixels separated into two pixels, the surface area of the on-screen pixel grid is reduced. Namely, at least a part of the pixels produced by separation are projected upon the regions of the pixel grid that would be formed between the pixels when a pixel separation element is not used, so that a portion of the pixel grid is turned into a pixel region.

In this embodiment, the red light emitted by the red laser light source 1 and the blue light emitted by the blue laser light source 3 is S-polarized and the green light emitted by the green laser light source 2 is P-polarized, with the light beams being incident on the birefringent plate 20 in the above-mentioned polarization states. As the birefringent plate 20 rotates, the pixel separation state varies with time in the following manner.

Figure 2A:
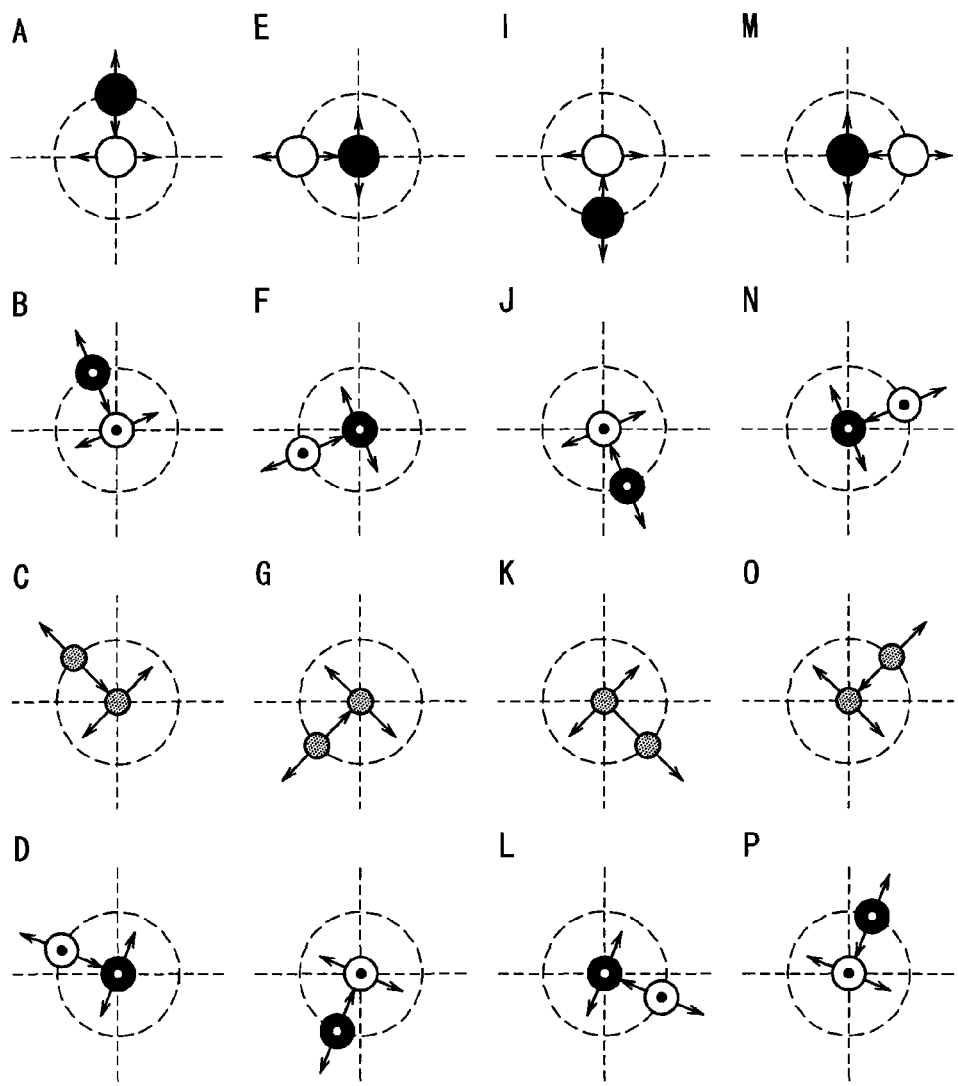
FIG. 2A is a schematic diagram of pixel separation patterns obtained using the same projection type image display device.

The pixel patterns that are formed by light exiting from the birefringent plate 20 on the screen 22 are illustrated schematically in FIG. 2A. In the drawings, the black circles represent the pixels of the pixel patterns formed by the red light (or blue light), i.e. S-polarized light, and the white circles represent the pixels of the pixel patterns formed by the green light, i.e. P-polarized light. The arrows indicate the polarization direction of light in each pixel. The size of the circles represents the relationship between the relative light intensities of the pixels. The points of origin of the Cartesian coordinates indicate the center locations of the pixels in the case where the birefringent plate 20 is not used. The radii of the dotted circles correspond to the amount of shift of the pixels produced by separation in the pixel patterns created by refraction during passage through the birefringent plate 20, in other words, the above-described amount of separation.

The 16 pixel patterns A through P that are shown in FIG. 2A illustrate the respective pixel separations obtained when the angle of rotation of the birefringent plate 20 relative to the point of origin is varied in successive increments of 22.5 degrees. For instance, if the angle of rotation of the birefringent plate 20 corresponding to pixel pattern A is used as a reference, then pixel pattern B corresponds to a state in which the birefringent plate 20 has been rotated 22.5 degrees relative to pixel pattern A.

In pixel pattern A, the pixel pattern (white circle) of the green light, i.e. the P-polarized light, is formed such that all of the light propagates in a linear fashion without being subjected to the refractive action of the birefringent plate 20 and no pixel separation is produced. By contrast, the pixel patterns (black circles) of the red light and blue light, i.e. the S-polarized light, are formed such that all of the light is subjected to refractive action. As a result, no pixel separation occurs, but the center locations shift upwards. In this pixel pattern A, pixels exhibiting no variations in light intensity are formed on the screen 22 both in the case of the P-polarized light and in the case of the S-polarized light.

Figure 2B:
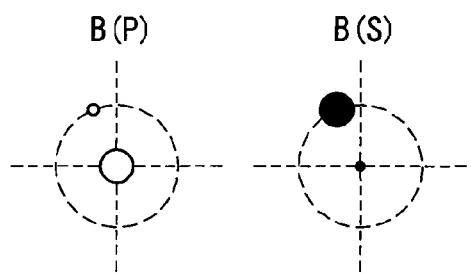
FIG. 2B is a schematic diagram illustrating pixel pattern B of FIG. 2A separately for each type of polarization.

By contrast, in pixel pattern B, a portion of the S-polarized light and P-polarized light is subjected to the refractive action. For this reason, the pixel patterns formed by the P-polarized and S-polarized light undergo separation into pixels in their original position and pixels shifted in the directions shown in the drawing. The relationship between the relative light intensities of the pixels of each pixel pattern is such that, in case of the S-polarized light (black circles), the intensity of the pixels in the original positions is reduced and the intensity of the shifted pixels is increased. The reverse is true for the P-polarized light (white circles). In the illustration of pixel pattern B in FIG. 2A, the pixel patterns of both types of polarization are shown overlapped in the drawing. On the other hand, in FIG. 2B, pixel pattern B is shown separately for each type of polarization. In FIG. 2B, B(P) represents a pixel pattern formed by the P-polarized light and B(S) represents a pixel pattern formed by the S-polarized light.

Figure 2C:
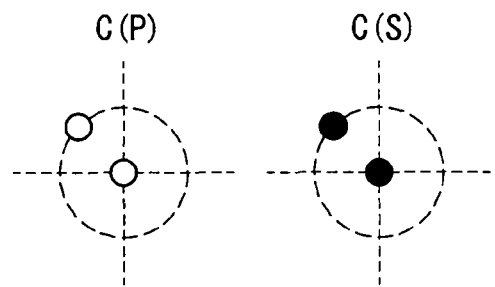
FIG. 2C is a schematic diagram illustrating pixel pattern C of FIG. 2A separately for each type of polarization.

Further, in pixel pattern C, the relationship between the relative light intensities of the pixels produced by separation is such that the intensity of the pixel in the original position is equal to the intensity of the shifted pixel both in the case of the S-polarized light and in the case of the P-polarized light. Accordingly, in FIG. 2A, the inside of the circles is filled with dots because the black circle and white circle coincide and overlap with each other. FIG. 2C illustrates this separately for each type of polarization.

The preferred amount of pixel separation effected by the pixel separation element (birefringent plate 20) depends on the numerical aperture of the spatial light modulation elements (transmissive liquid crystal light valves 16-18). As used herein, the term "numerical aperture" refers to the ratio of the effective pixel surface area to the pixel surface area. The "effective pixel surface area" is defined as the surface area providing effective action that controls the transmission or reflection of light in the spatial light modulation elements.

If the numerical aperture is around 50%, the amount of separation preferably is not more than 50% of the pixel pitch. When the numerical aperture is around 80%, the amount of separation preferably is not more than 20% of the fixed pixel pitch. The reason for this is the decrease in resolution that occurs when the amount of separation becomes too large.

Next, a description will be directed to the speckle noise-reducing action according to the present embodiment. First of all, due to the fact that pixels are separated into two pixels by the birefringent plate 20, the distribution of brightness on the screen 22 is rendered more uniform in comparison with projection type image display devices that do not use a pixel separation element. This permits reduction in speckle noise even if the screen 22 is kept in focus.

Furthermore, the orientation of the optic axis of the birefringent plate 20 changes with time due to the fact that the birefringent plate 20 is rotated by the birefringent plate rotary drive unit 26 about an axis of rotation parallel to the optical axis of the projection optical system 21. For this reason, the pixel separation state changes as shown in FIG. 2A. Namely, the polarization state and illumination position of the pixel patterns on the screen change with time, thereby generating a variety of speckle patterns and reducing the speckle noise.

Further, the speckles are reduced further by the rotation of the microlens arrays 7-9 inserted in front of the rod integrators 10-12. Rotated by the microlens array rotary drive units 23-25, the microlens arrays 7-9 operate as phase modulators. When passing through the microlenses, the laser light acquires a number of optical path differences. For this reason, various rapidly changing speckle patterns appear on the screen, which makes it possible to reduce the speckle noise.

In order to enhance the speckle noise reduction effect, the rotation of the microlens arrays 7-9 and the rotation of the birefringent plate 20 are adjusted so as to avoid mutual synchronization.

The rotation of the microlens arrays 7-9 temporally averages the phases of the light projected upon the screen, thereby effectively reducing the speckle noise. It cannot, however, change the dimensions of the on-screen pixel grid. By contrast, as described above, the use of the pixel separation element, such as the birefringent plate 20, allows for reducing the region of the pixel grid and rendering brightness more uniform along with temporally averaging polarization differences, thereby making even greater speckle noise reduction possible.

For the purpose of speckle reduction, this embodiment uses a speckle reduction means based on a pixel separation element utilizing the birefringent plate 20 in combination with a speckle reduction means that rotates the microlens arrays, 7-9. However, the combinations of the speckle reduction means are not limited to the above.

As discussed above, the speckle reduction means based on pixel separation element of the present embodiment possesses the feature that it effects changes in polarization state, brightness uniformity, and pixel position of light projected upon the screen, and a superimposition effect can be obtained when it is used in combination with speckle reduction means providing other types of physical action.

In order to reduce the visibility of the pixel grid created by the two-dimensional spatial light modulation elements, it is necessary to dispose certain means between the spatial light modulation elements and the screen. This is due to the fact that it is difficult to reduce the surface area of the pixel grid between the laser light sources and the spatial light modulation elements. Further, the speckle reduction means based on pixel separation element according to the present embodiment can be used effectively in combination with speckle reduction means applied to the laser light sources themselves and speckle reduction means applied between the laser light sources and the spatial light modulation elements.

More specifically, the speckle reduction means based on pixel separation element is effective in combination with speckle reduction means that include: (1) expanding the wavelength width of the laser light sources; (2) using a plurality of laser light sources of different wavelengths; (3) averaging the phases of the illumination light incident upon the spatial light modulation elements; and (4) increasing the NA on the screen side.

Embodiment 2

Figure 3:
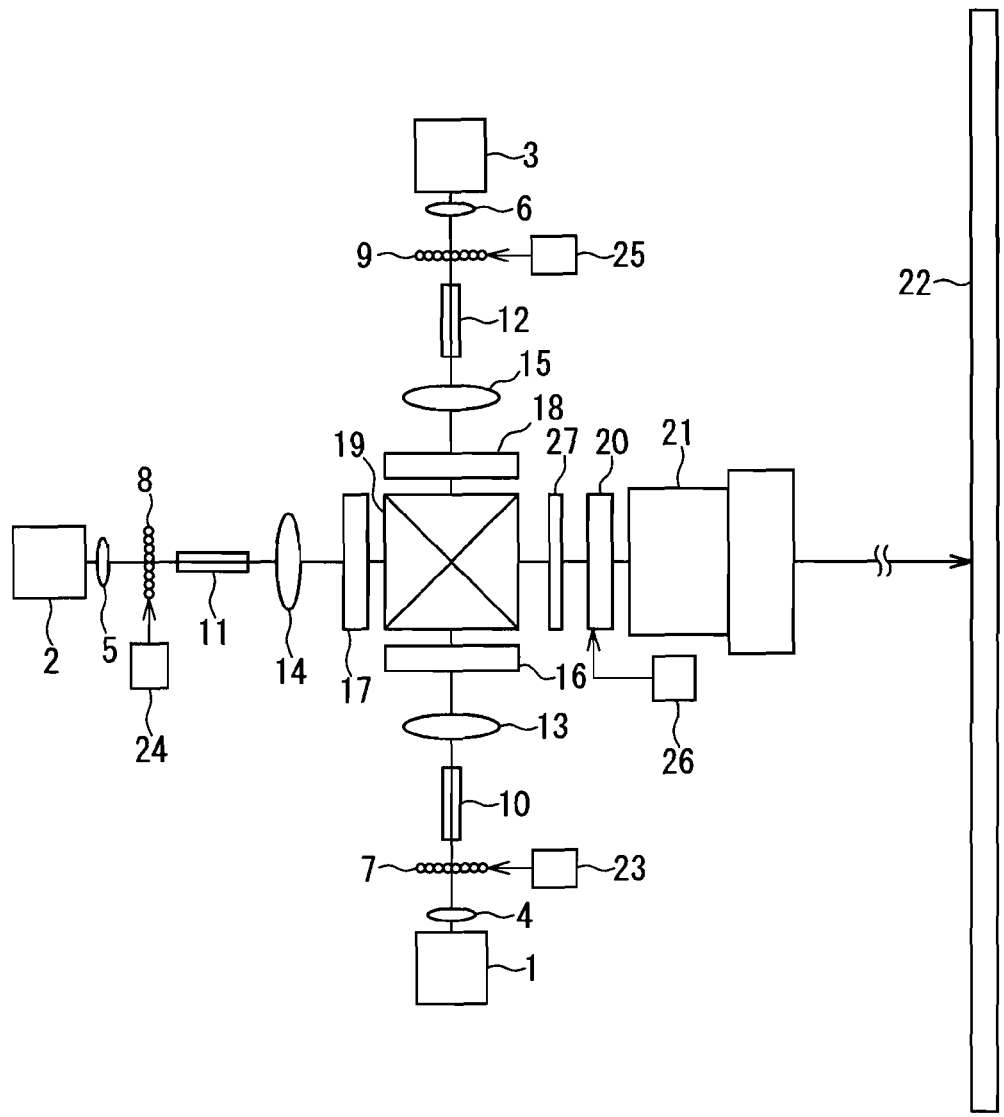
FIG. 3 is a schematic diagram of a projection type image display device used in Embodiment 2 of the present invention.

FIG. 3 is a diagram that describes a projection type image display device used in Embodiment 2 of the present invention. This embodiment differs from Embodiment 1 in that a phase retardation plate 27 is added between the beam combining prism 19 and the birefringent plate 20. Accordingly, the same reference numerals are assigned to the same components as the components used in Embodiment 1, and the corresponding descriptions are omitted.

The phase retardation plate 27 is a quarter-wave plate that generates a phase difference of $\pi/2$ between the S-polarization direction and the P-polarization direction. As it passes through the phase retardation plate 27, the polarization state of the red, green, and blue laser light is converted from linearly polarized light to circularly polarized light.

Figure 4:
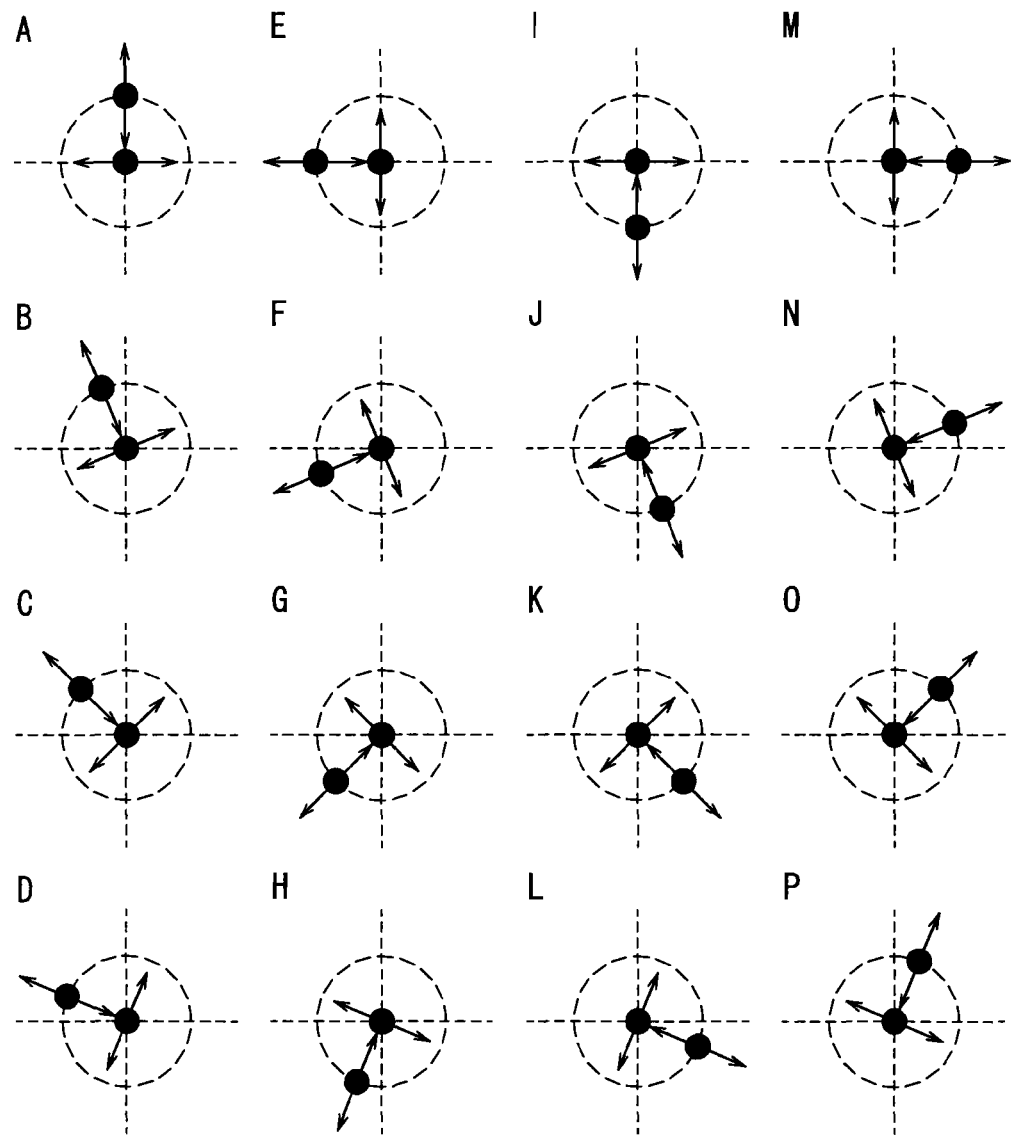
FIG. 4 is a schematic diagram of pixel separation patterns obtained using the same projection type image display device.

FIG. 4 shows a schematic illustration of the pixel patterns formed by light exiting from the birefringent plate 20 in the present embodiment. In the same manner as in FIG. 2, the 16 pixel patterns A through P that are shown in FIG. 4 illustrate the respective pixel separations obtained when the angle of rotation of the birefringent plate 20 is varied in successive increments of 22.5 degrees. In the drawings, the black circles represent the position of pixels in pixel patterns formed by light of each color, and the arrows represent the polarization direction.

In contrast to Embodiment 1, in this embodiment, all the red, green, and blue laser light is incident upon the birefringent plate 20 as circularly polarized light, as a result of which, when the influence of chromatic dispersion is disregarded, the pixel patterns produced by pixel separation using birefringence become identical regardless of the wavelength. Further, the light intensities of the pixels produced by separation into two pixels are kept equal.

Although this embodiment combines a speckle reduction means based on pixel separation element using the birefringent plate 20 with a speckle reduction means based on rotation of the microlens arrays 7-9, the combinations of the speckle reduction means are not limited to the above.

Embodiment 3

Figure 5:
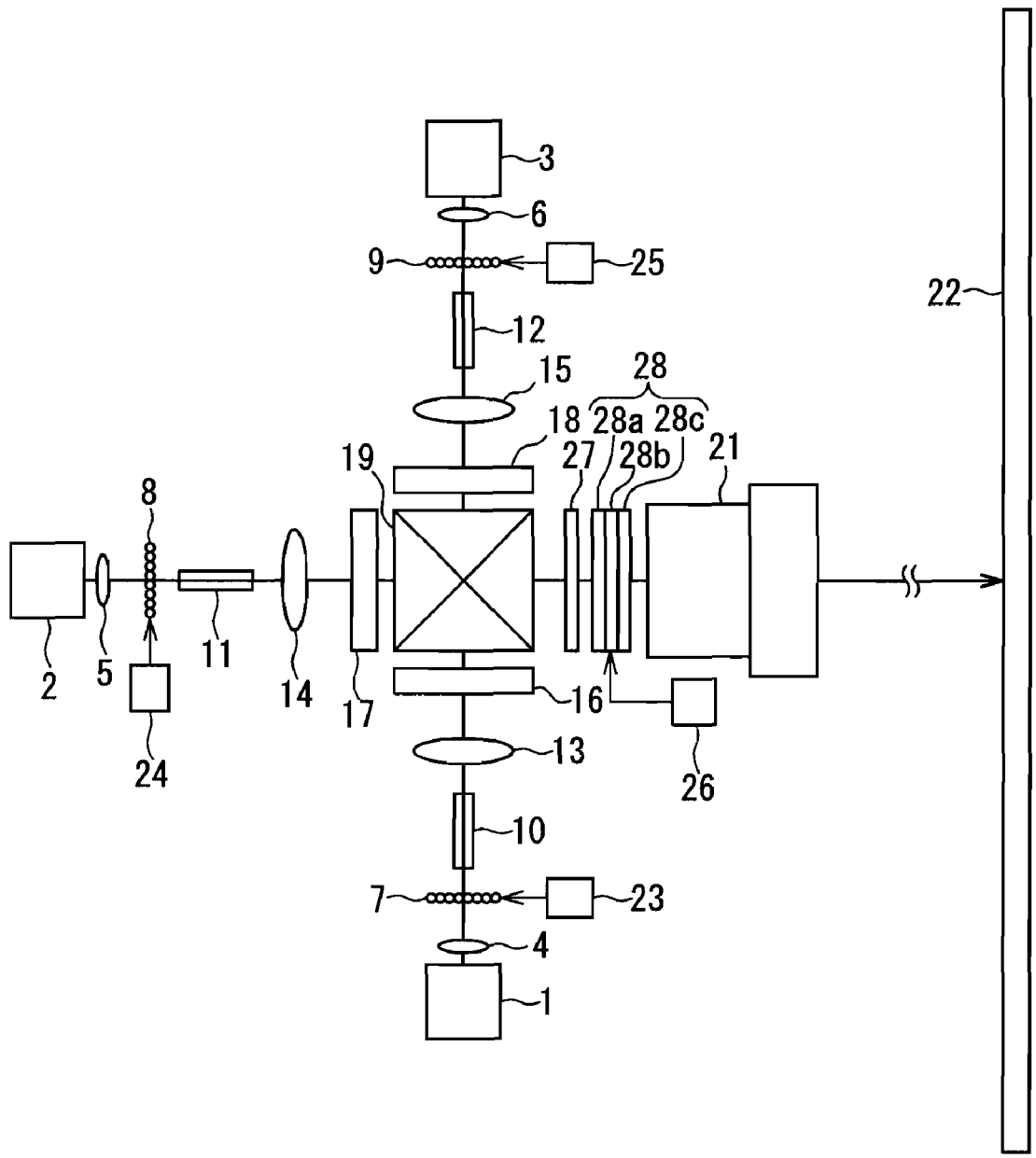
FIG. 5 is a schematic diagram of a projection type image display device used in Embodiment 3 of the present invention.

FIG. 5 is a diagram that describes a projection type image display device used in Embodiment 3 of the present invention. This embodiment differs from Embodiment 2 in that the birefringent plate 28, which constitutes a pixel separation element, is made up of three closely spaced first to third birefringent plates 28a-28c. The use of the first, second and third birefringent plates 28a-28c allows for spatially separating the pixel patterns into four pixels.

The arrangement of the birefringent plates used in this embodiment will be described in more detail below. The circularly polarized red, green, and blue light exiting from the phase retardation plate 27 impinges upon the first birefringent plate 28a, whereupon the light that exits from the first birefringent plate 28a impinges upon the second birefringent plate 28b and the light exiting from the second birefringent plate 28b impinges upon the third birefringent plate 28c. The optic axis of the second birefringent plate 28b projected onto the incident surface of the second birefringent plate 28b is in a mutually orthogonal relationship to the optic axis of the first birefringent plate 28a projected onto the incident surface of the first birefringent plate 28a. Further, the angle that the optic axis of the third birefringent plate 28c projected onto the incident surface of the third birefringent plate 28c makes with the optic axis of the first birefringent plate 28a projected onto the incident surface of the first birefringent plate 28a is n×45° (wherein n is an integer other than 0).

Figure 6:
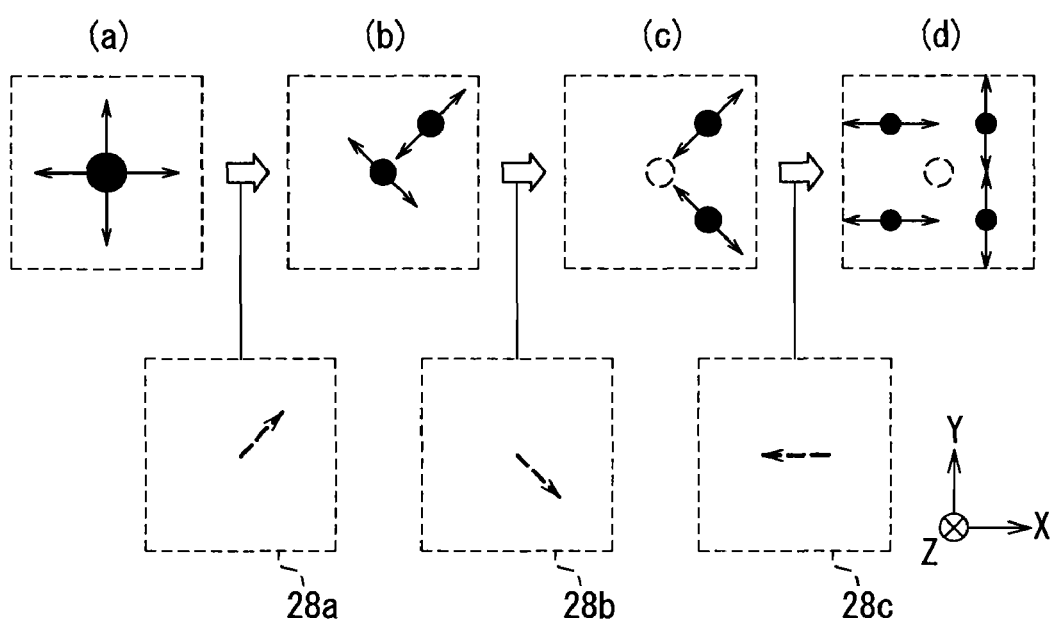
FIG. 6 is a schematic diagram representing the process of pixel separation in the same projection type image display device.

FIG. 6 illustrates a process in which a single pixel pattern is separated into four pixel patterns. On the incident faces of the birefringent plates 28, the horizontal direction is the X-axis, the vertical direction is the Y-axis, and the direction of propagation of projected light is the Z-axis. FIG. 6(a) shows light incident upon the first birefringent plate 28a. The light is circularly polarized.

The first birefringent plate 28a is configured such that the optic axis of the first birefringent plate 28a projected onto its incident face is oriented in the +45-degree direction relative to the X-axis. Accordingly, as shown in FIG. 6(b), light incident upon the first birefringent plate 28a is separated into an ordinary ray (pixel in the center of (b)) and an extraordinary ray (pixel in the upper right corner of (b)).

The second birefringent plate 28b is configured such that the optic axis of the second birefringent plate 28b projected onto its incident face is oriented in the −45-degree direction relative to the X-axis. Accordingly, when light that was an ordinary ray when it passed through the first birefringent plate 28a (pixel in the center of (b)) passes through the second birefringent plate 28b, it turns into an extraordinary ray, with only the pixel position being shifted (pixel in the lower right corner of (c)) as a result of walk-off (angle of offset of the axis of the exiting light relative to the axis of the incident light), without pixel separation taking place.

Here, the birefringent plate 28 is adjusted such that the amount of walk-off of the extraordinary ray produced by the first birefringent plate 28a is made equal to the amount of walk-off of the extraordinary ray produced by the second birefringent plate 28b.

Finally, the light exiting from the second birefringent plate 28b impinges upon the third birefringent plate 28c. The third birefringent plate 28c is configured such that the optic axis of the third birefringent plate 28c projected onto its incident face is oriented in the +180-degree direction relative to the X-axis.

The light incident upon the third birefringent plate 28c is linearly polarized light oriented in the +45-degree direction and linearly polarized light oriented in the −45-degree direction relative to the X-axis. Accordingly, each one of the two pixels is separated into an ordinary ray and an extraordinary ray and, as shown in FIG. 6(d), a total of four pixel patterns are formed.

Here, the birefringent plates 28 are adjusted such that the amount of walk-off of the extraordinary ray produced by the third birefringent plate 28c is $2^{1/2}$ (square root) times greater than the amount of walk-off of the extraordinary ray produced by the first and second birefringent plates 28a, 28b. Accordingly, the produced pixel pattern is such that the separated four pixels are located at the corners of a square.

Figure 7:
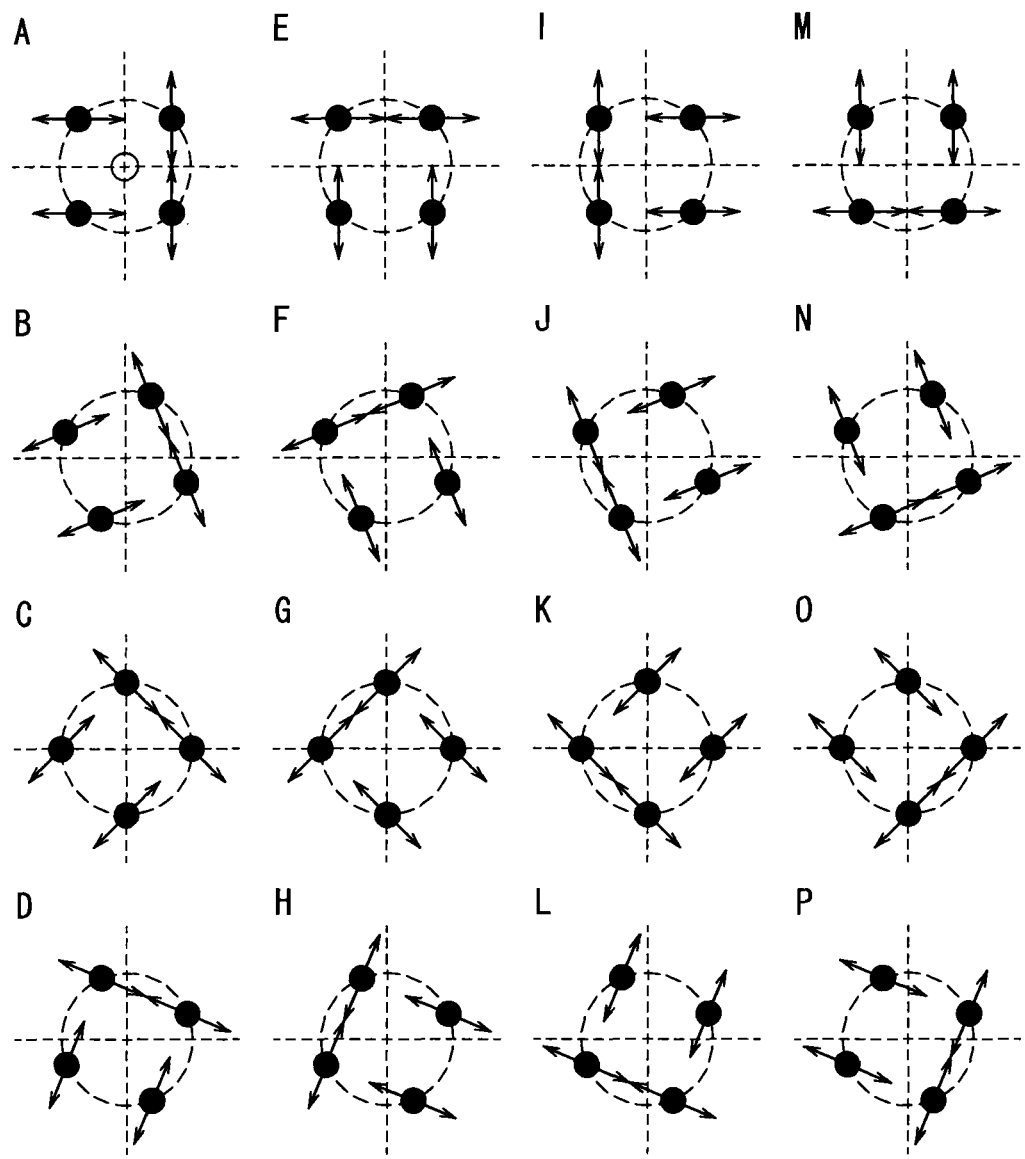
FIG. 7 is a schematic diagram of pixel separation patterns obtained using the same projection type image display device.

FIG. 7 shows a schematic illustration of changes in the pixel patterns of light exiting from the birefringent plate 28. The pixel pattern variations illustrated in the same drawing are identical for the red, green, and blue laser light. In the drawing, the black circles represent the position of the pixels produced by separation and the arrows represent the polarization direction. In the same manner as in FIG. 2, the 16 pixel patterns A through P illustrate the respective pixel separations obtained when the angle of rotation of the birefringent plates 28 is varied in successive increments of 22.5 degrees. Since all the light incident upon the birefringent plates 28 is circularly polarized, the light that exits from the pixel separation element is separated into 4 pixels at the four corners of a square.

Next, a description will be given of speckle noise reduction in the present embodiment. Due to the fact that pixels are separated into four pixels by the birefringent plates 28 and projected upon the screen 22, the distribution of brightness on the screen 22 is rendered more uniform in comparison with cases in which no pixel separation is performed, or cases in which pixels are separated into two pixels. This permits reduction in speckle noise even if the screen 22 is maintained in focus.

Further, due to the fact that the birefringent plate 28 is rotated by the birefringent plate rotary drive unit 26 about an axis of rotation parallel to the optical axis of the projected light, the orientation of the optic axis of the birefringent plate 28 changes with time, and for this reason, the position of illumination and polarization state of the pixel patterns change as shown in the FIG. 7. As a result, a variety of speckle patterns are generated and speckle noise is reduced.

In addition, the speckle reduction effects are superimposed when the above-described means is used in combination with a speckle reduction means using rotation of the microlens arrays 7-9.

Here, the respective intensities of the four pixel patterns are maintained constant and exhibit no changes as the birefringent plate 28 rotates. Further, the dashed circles in FIG. 7 show a path of change in the central position of the separated pixels due to the rotation of the birefringent plate 28. At any point along this path, the time-integrated intensity of the S-polarized component and the time-integrated intensity of the P-polarized component remain the same. All this is effective in terms of speckle reduction.

When speckle contrast was measured based on the configuration of the present embodiment, the results were as follows.

The light source used for evaluation was a continuously driven green laser light source with a wavelength of 532 nm, for which the second harmonic of a Yb fiber laser was used. A 0.7-inch liquid crystal panel having a microlens array with pixels of 1,280 pixels (lateral) by 720 pixels (vertical), in which a pixel pitch is 12 micron, was used as the liquid crystal panel 17. A plate fabricated by laminating three birefringent plates 28a-28c made of quartz crystal was used as the birefringent plate 28 (pixel separation element). A model optical system simulating the human eye, along with a 1,400,000-pixel CCD camera, was used as a measuring system.

The value of speckle contrast, which was 13.5% when the pixel separation element was not used, was reduced to 11.5% by inserting the birefringent plate 28 of the present embodiment in a fastened manner. It was further reduced to 10.2% by rotating the birefringent plate 28.

Embodiment 4

Figure 8:
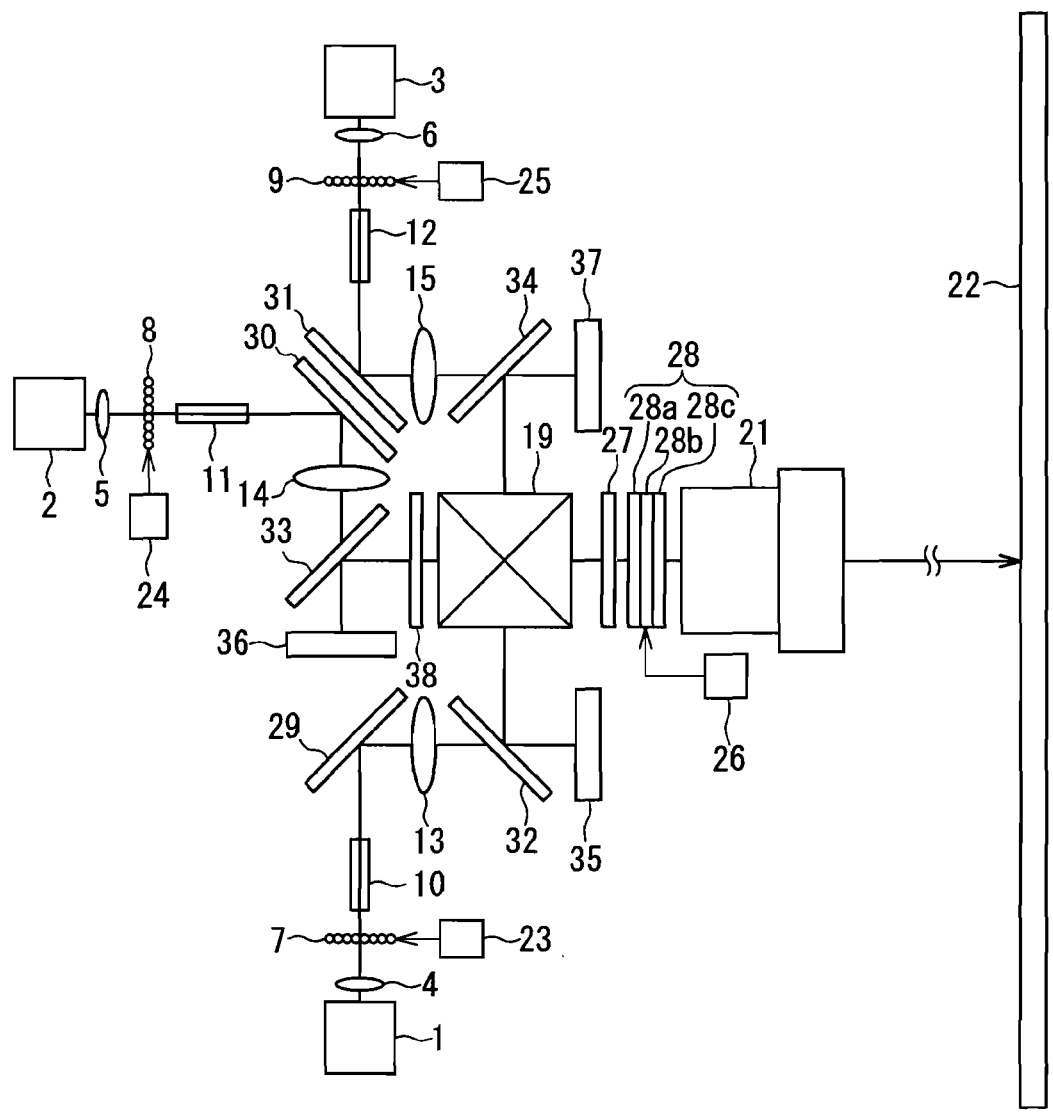
FIG. 8 is a schematic diagram of a projection type image display device used in Embodiment 4 of the present invention.

FIG. 8 is a diagram that describes a projection type image display device used in Embodiment 4 of the present invention. This embodiment differs from Embodiment 3 in that reflective liquid crystal light valves 35-37 are used as the spatial light modulation elements. The use of different spatial light modulation elements results in a somewhat different illumination optical system.

In FIG. 8, laser light beams exiting from rod integrators 10-12 pass through total reflection mirrors 29-31, relay optical system 13-15, and polarizing beam splitters 32-34 and form images on the reflective liquid crystal light valves 35-37, which serve as the spatial light modulation elements.

The polarizing beam splitters 32-34 have characteristics of reflecting S-polarized light and transmitting P-polarized light. The light emitted from the red, green, and blue laser light sources 1-3 is P-polarized. As it propagates forward, the incident light is transmitted through the polarizing beam splitters 32-34.

After being rotated 90 degrees by the reflective liquid crystal light valves 35-37, the polarized light turns into S-polarized light, as a result of which, on the return trip, the light is reflected by the polarizing beam splitters 32-34 and impinges upon the beam-combining prism 19. Before impinging upon the beam-combining prism 19, laser light from the green laser light source 2 passes through a half-wave plate 38 that rotates the polarization direction 90 degrees.

In this embodiment, effective speckle reduction is made possible because pixel patterns are separated into four pixels by the birefringent plate 28, and the polarization and position of the pixel patterns is subjected to temporal modulation.

Further, a superimposition of speckle reduction effects can be accomplished by rotating the microlens arrays 7-9.

Although this embodiment describes an example in which liquid crystal light valves are used as the reflective spatial light modulation elements, the same effects can be obtained when using other reflective spatial light modulation elements such as DMDs, etc.

Embodiment 5

Figure 9:
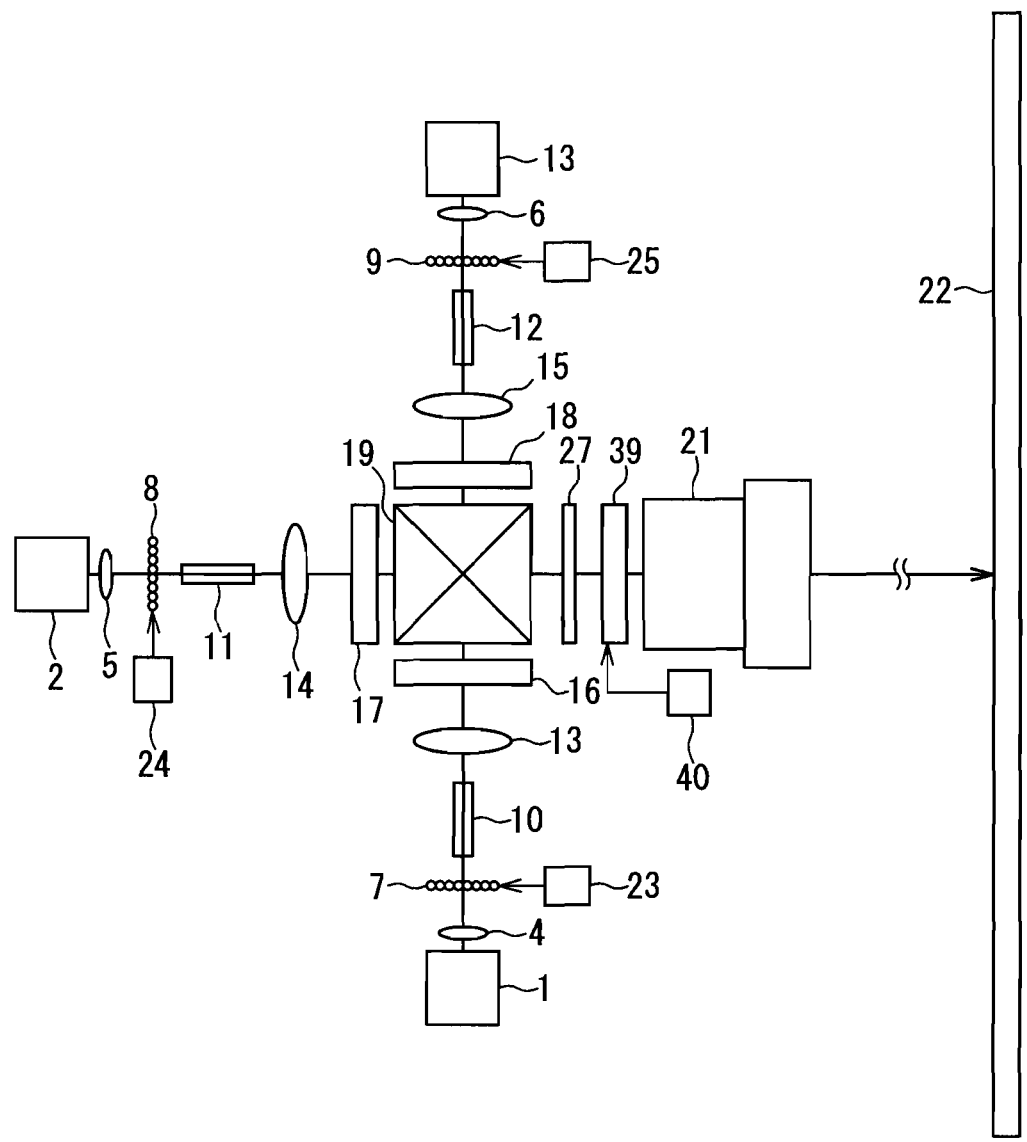
FIG. 9 is a schematic diagram of a projection type image display device used in Embodiment 5 of the present invention.

FIG. 9 is a diagram that describes a projection type image display device used in Embodiment 5 of the present invention. This embodiment differs from Embodiment 3 in that a liquid crystal element 39 is used as a pixel separation element and this element has a liquid crystal element control unit 40 as a modulating means. The liquid crystal element control unit 40 can temporally and spatially modulate the birefringence of the liquid crystal.

By changing the voltage applied to the liquid crystal element 39, the liquid crystal element control unit 40 can change the direction of the optical axis of birefringence of the liquid crystal element 39 and temporally modulate the state of the exiting light as a pixel separation element. As a result, the positions of illumination and polarization states of the pixel patterns are varied with time and speckle noise is reduced.

Embodiment 6

Figure 10:
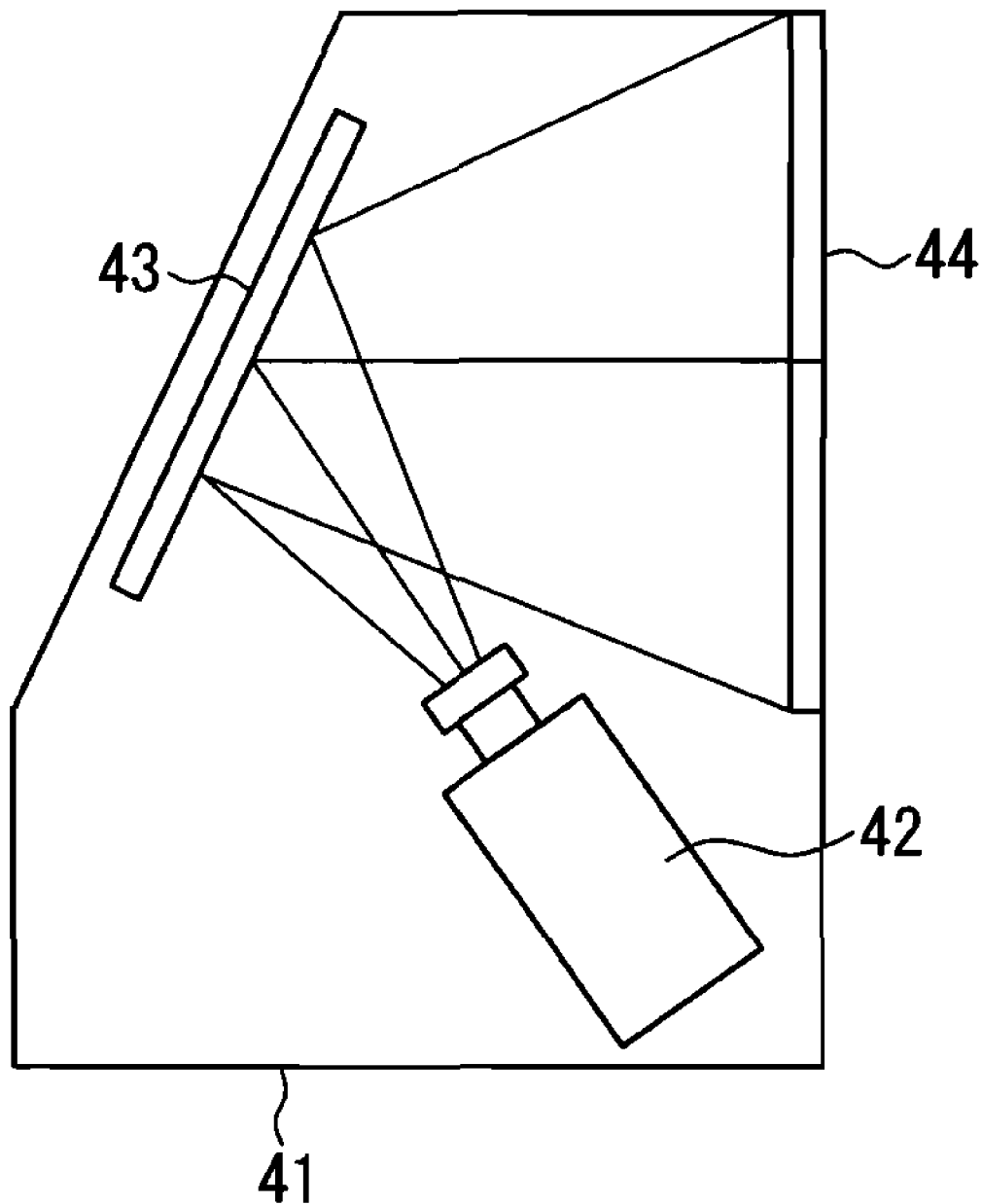
FIG. 10 is a schematic diagram of a projection type image display device used in Embodiment 6 of the present invention.

FIG. 10 is a diagram that describes a projection type image display device used in Embodiment 6 of the present invention. The projection type image display device of this embodiment is a so-called rear-projection TV including a screen 44 and components ranging from laser light sources to a projection optical system, which are contained in a housing 41. Its optical engine 42 is constituted, for example, by the optical system of the projection type image display device of Embodiment 3, only without the screen 22.

In the drawing, after being reflected by a total reflection mirror 43, projected light exiting from the optical engine 42 forms an image on the screen 44.

In this embodiment, the use of the components described in Embodiment 3, such as the birefringent plate rotary drive unit 26 and birefringent plate 28 serving as a pixel separation element, permits reduction in the visibility of the pixel grid of the pixels projected upon the screen 44 as well as allows for the illumination position and polarization state of the pixel patterns to be varied with time, thereby reducing speckle noise.

The components that constitute the optical engine 42 are not limited to the optical system of the projection type image display device of Embodiment 3 and any optical engine utilizing any of the speckle suppressing means according to the present invention, including other embodiments, can be employed as the optical engine 42 for use in rear-projection TVs.

INDUSTRIAL APPLICABILITY

The projection type image display device of the present invention is useful as a projector or another projection type image display device that employs laser light sources and is capable of effectively reducing speckle noise by rendering the pixel grid less conspicuous in a simple and convenient manner.

The invention claimed is:

1. A projection type image display device comprising:
   at least one laser light source that emits laser light;
   a spatial light modulation element that modulates the laser light in response to a picture signal;
   a pixel separation element that spatially separates the modulated laser light exiting from the spatial light modulation element into a plurality of light beams using birefringence;
   a projection optical system that projects the modulated laser light exiting from the pixel separation element upon a screen;
   and
   a pixel separation element modulator that controls the pixel separation element so as to modulate temporally the direction of birefringence of the pixel separation element.

2. The projection type image display device according to claim 1, wherein the pixel separation element is constituted by a plurality of birefringent plates, and the plurality of birefringent plates are disposed such that the optic axes thereof are oriented in mutually different directions.

3. The projection type image display device according to claim 1, wherein the spatial light modulation element is a transmissive liquid crystal light valve.

4. The projection type image display device according to claim 1, wherein a phase modulator that temporally modulates the phase of the laser light is disposed between the spatial light modulation element and the laser light source.

5. The projection type image display device according to claim 4, wherein the phase modulator is constituted by a microlens array and a microlens array rotary drive unit that rotates the microlens array.

6. The projection type image display device according to claim 1, wherein a phase retardation plate that converts the polarization state of the laser light from linear polarization to elliptical polarization is disposed between the spatial light modulation element and the pixel separation element.

7. The projection type image display device according to claim 1, wherein the polarization direction of the modulated laser light projected in an enlarged fashion upon the screen is temporally modulated.

8. The projection type image display device according to claim 1, wherein the position of projection of the modulated laser light projected in an enlarged fashion upon the screen is temporally modulated.

9. The projection type image display device according to claim 1, wherein the pixel separation element is a birefringent plate and the pixel separation element modulator is a birefringent plate rotary drive unit that rotates the birefringent plate.

* * * * *